[19] United States Patent
Iida et al.

[11] 4,412,424
[45] Nov. 1, 1983

[54] AIR CONDITIONING SYSTEM FOR PREVENTING FOGGING OF VEHICLE WINDOWS

[75] Inventors: Katumi Iida; Shinji Sutoh; Toshizo Hara, all of Konan, Japan

[73] Assignee: Diesel Kiki Company, Ltd., Tokyo, Japan

[21] Appl. No.: 334,054

[22] Filed: Dec. 23, 1981

[30] Foreign Application Priority Data

Dec. 29, 1980 [JP] Japan ................. 55-188692

[51] Int. Cl.³ .................. F25B 41/00; B60H 1/00
[52] U.S. Cl. ...................... 62/209; 62/150; 62/227; 236/91 F; 98/2.09
[58] Field of Search ........... 62/227, 209, 215, 228 R, 62/226, 150, 208, 160, 229; 98/208, 209; 236/91 R, 91 F, 44 R, 44 A; 165/28, 42, 43, 17

[56] References Cited
U.S. PATENT DOCUMENTS 4,209,994  7/1980  Mueller et al. ............. 62/209
4,289,272  9/1981  Marase et al. ............. 62/160
4,356,705 11/1982  Sutoh et al. ............. 62/209

Primary Examiner—Albert J. Makay
Assistant Examiner—Harry Tanner
Attorney, Agent, or Firm—Jordan & Hamburg

[57] ABSTRACT

An air conditioning system for preventing the fogging of vehicle windows includes a defroster switch which is closed to turn on a compressor when the temperature at or around the surfaces of an evaporator drops down to a predetermined off mode level. When the temperature outside the vehicle passenger compartment drops from a relatively high level to a first predetermined level, the off mode level becomes saturated to a constant (maximum) level. As the outside temperature further drops to reach a predetermined second temperature level, the off mode level is progressively lowered from the maximum level to a lower level. With this control, the compressor is turned on again after being closed by closing of the defroster switch, thereby permitting the vehicle windows to be cleared of the fogging from their inner surfaces.

5 Claims, 7 Drawing Figures

Fig. 1
PRIOR ART
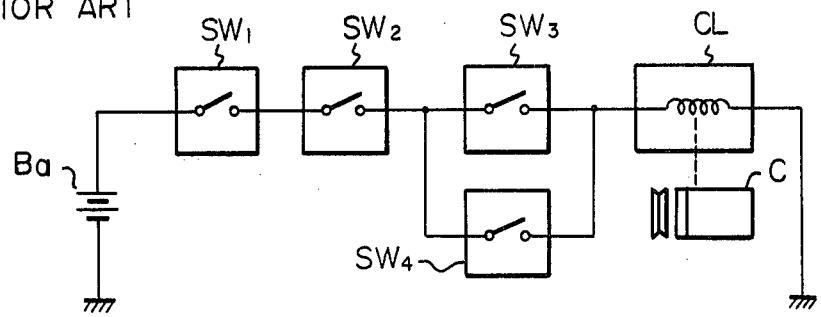
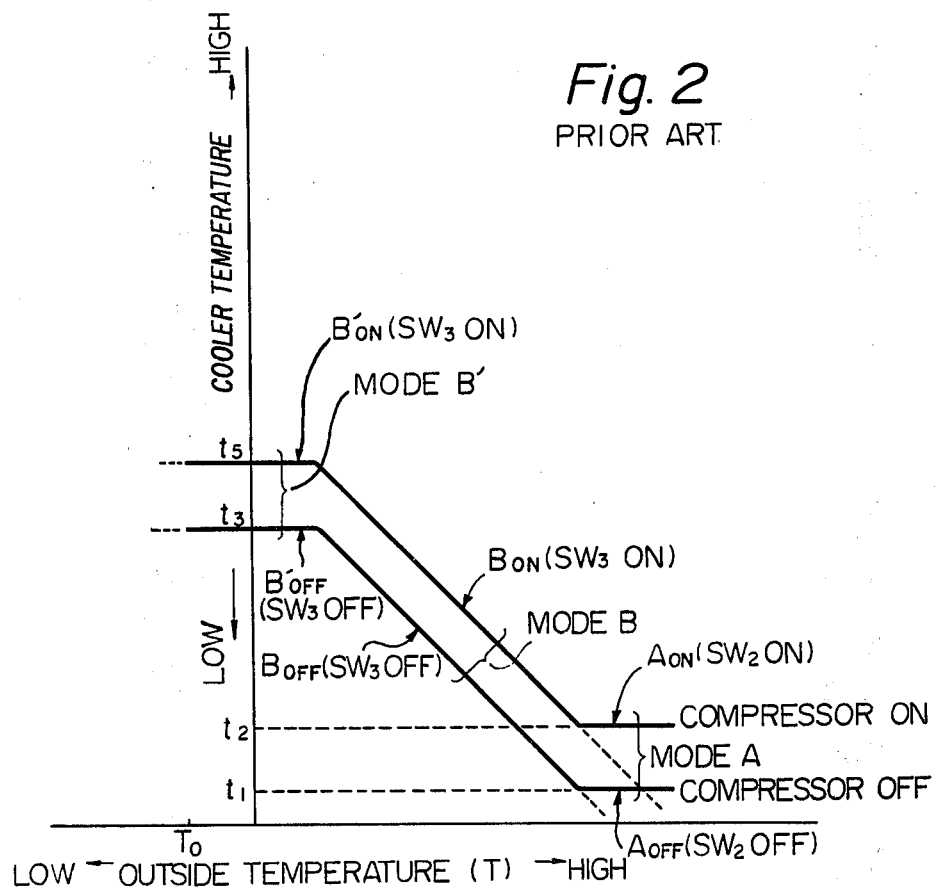
Fig. 2
PRIOR ART

AIR CONDITIONING SYSTEM FOR PREVENTING FOGGING OF VEHICLE WINDOWS

BACKGROUND OF THE INVENTION

The present invention relates to an air conditioning system for an automotive vehicle or the like and, more particularly, to an apparatus for controlling the air conditioning system to prevent the fogging or dimming of vehicle windows due to condensation of moisture on the window inner surfaces especially when the temperature outside the vehicle passenger compartment considerably drops in the winter. Such fogging impairs the visibility of the vehicle operator and creates a potentially dangerous situation.

It is generally known that fogging on the inner surfaces of vehicle windows can be removed by operating an evaporator of the air conditioner, i.e. the cooler, to lower the temperature inside the passenger compartment.

In an automotive air conditioner of the type described, a compressor drive control circuit for driving the cooler for such a specific purpose includes a series connection of an air conditioner switch connected with a power supply, a defroster switch for preventing the evaporator from being freezed, and a variable temperature sensitive switch designed to efficiently control the drive of the compressor in accordance with the varying surrounding conditions, particularly the outside temperature. Through this series connection, a magnet clutch drive coil for driving the compressor is energized by the power supply.

The temperature sensitive switch of the series connection is controlled in a predetermined on-off mode wherein the temperature levels at which the switch are turned on and off are individually variable with a change in the outside temperature. An arrangement is made such that when the outside temperature is very low, that is, at a predetermined low level as in the winter, the temperature sensitive switch is automatically turned off to keep the compressor from operating. The result will be a favorable decrease in the operation rate of the compressor. However, when fogging occurs on the vehicle windows while the compressor is inoperable, the cooler cannot be activated to remove the fog even if the air conditioner switch and defroster switch of the series connected are both turned on, due to the off state of the temperature sensitive switch.

An implement heretofore proposed to settle this problem comprises a variable temperature sensitive bypass switch which is connected in parallel with the above-mentioned first temperature sensitive switch of the series connection. When the outside temperature drops beyond the predetermined low level at which the compressor becomes inoperable, the bypass switch is turned on to establish a power supply path to the magnet clutch drive coil bypassing the first temperature sensitive switch which has then been turned off. This forces the compressor into operation for clearing the vehicle windows of the fog. However, the on and off temperature levels of the bypass switch and those of the first temperature sensitive switch involve, depending on the design, a possibility that the bypass switch is not necessarily turned on while the first temperature sensitive switch is off and, therefore, fails to activate the compressor to remove the fog. Suppose, for example, that the first temperature sensitive switch turns on at a temperature of 10° C. and off at a temperature of 5° C., and the bypass switch turns on at a temperature of 7° C. (low temperature level mentioned previously). Then, if the outside temperature is 8° C. and the vehicle windows are foggy, the first switch remains turned off until the outside temperature rises beyond 10° C. while the bypass switch remains turned off until the outside temperature drops beyond 7° C. As a result, the fog on the vehicle windows cannot be cleared as long as the outside temperature lies within the range of 7° C. to 10° C.

Thus, none of the heretofore known apparatuses for clearing fog on vehicle windows is fully acceptable and has various problems still left unsolved.

SUMMARY OF THE INVENTION

An air conditioning system for controlling a temperature in an enclosure embodying the present invention comprises a cooler for discharged cooled air into the enclosure, a cooler temperature sensor for sensing a temperature of the cooler, an outside temperature sensor for sensing a temperature outside the enclosure and an operation controller for turning the cooler on and off. The operation controller is constructed to compute a control on temperature and a control off temperature as predetermined functions of the cooler temperature and the outside temperature. The controller functions to turn the cooler on when the cooler temperature is higher than the control on temperature and to turn the cooler off when the cooler temperature is lower than the control off temperature. The controller is further constructed to change the control on and off temperatures to different levels such that the control on and off temperatures increases as the outside temperature decreases and when the outside temperature is above a first predetermined temperature, the control on and off temperatures are maintained constant at upper limits when the outside temperature is varied between the first predetermined temperature and a second predetermined temperature which is lower than the first predetermined temperature, and the control on and off temperatures decreases as the outside temperature further decreases and when the outside temperature is below the second predetermined temperature.

In accordance with the present invention, an air conditioning system for preventing the fogging of vehicle windows includes a defroster switch which is closed to turn on a compressor when the temperature at or around the surfaces of an evaporator drops down to a predetermined off mode level. When the temperature outside the vehicle passenger compartment drops from a relatively high level to a first predetermined level, the off mode level becomes saturated to a constant (maximum) level. As the outside temperature further drops to reach a predetermined second temperature level, the off mode level is progressively lowered from the maximum level to a lower level. With this control, the compressor is turned on again after being closed by closing of the defroster switch, thereby permitting the vehicle windows to be cleared of the fogging from their inner surfaces.

It is accordingly an object of the present invention to provide an anti-fogging apparatus for an automotive air conditioning system which positively drives the compressor and thereby the cooler to clear the fog on vehicle windows even through the outside temperature may drop to a significant level.

It is another object of the present invention to provide an anti-fogging apparatus for an automotive air conditioning system which operates in a more efficient manner than comparable apparatus known heretofore.

It is another object of the present invention to provide a generally improved anti-fogging apparatus for an automotive air conditioning system.

Other objects, together with the foregoing, are attained in the embodiment described in the following description and illustrated in the accompanying drawings.

BRIEF DESCRIPTION OF THE DRAWINGS

FIG. 1 is a block diagram showing a compressor drive control of a prior art automotive air conditioning system;

FIG. 2 is a view explanatory of an operation of the compressor drive control shown in FIG. 1;

DESCRIPTION OF THE PREFERRED EMBODIMENTS

While the anti-fogging apparatus for an automotive air conditioning system of the present invention is susceptible of numerous physical embodiments, depending upon the environment and requirements of use, substantial numbers of the herein shown and described embodiment have been made, tested and used, and all have performed in an eminently satisfactory manner.

Referring to FIG. 1 of the drawings, a compressor drive control associated with a prior art automotive air conditioning system comprises a series connection of an air conditioner switch $SW_1$, a defroster switch $SW_2$ and a variable temperature sensitive switch $SW_3$. This series connection is connected at its one end with a power supply Ba and at its other end with a magnetic clutch drive coil CL, which is adapted to on-off control a compressor C. A variable temperature sensitive bypass switch $SW_4$ is connected with the series circuit bypassing the switch $SW_3$, that is, in parallel with the switch $SW_3$.

The air conditioner switch $SW_1$ is adapted to drive the compressor C and constructed such that, when turned on, it renders the compressor C and, therefore, the cooler operative to lower the temperature inside the vehicle passenger compartment or to clear fogging from the inner surfaces of the vehicle windows. The defroster switch $SW_2$ is turned on or off in response to an output of a temperature sensor associated with an evaporator to sense a temperature at or around the surfaces of an evaporator. The state of the defroster switch $SW_2$ is varied according to an operation mode A shown in FIG. 2 and which has an on mode temperature level $A_{ON}$ at which the defroster switch $SW_2$ is to turn on and an off mode temperature level at which the same is to turn off. When the output of the evaporator temperature sensor indicates a temperature drop down to a level $t_1$ near 0° C., for example, the defroster switch $SW_2$ is turned off to deactivate the compressor C. When the sensor output represents an increase in the evaporator temperature up to a level $t_2$ somewhat higher than the level $t_1$, the defroster switch $SW_2$ is turned on to activate the compressor C. Such an on-off control of the compressor C prevents the evaporator from becoming freezed.

Figure 2A:
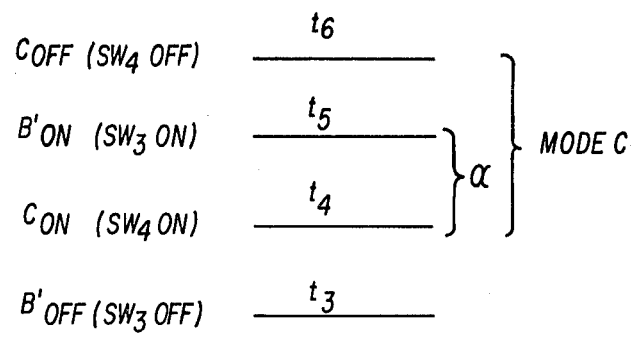
FIG. 2A is a view explanatory of the operation of the compressor drive control shown in FIG. 1.

The variable temperature sensitive switch $SW_3$ is on-off controlled as shown in FIG. 2 in accordance with operation modes B and B' which individually have off mode temperature levels $B_{OFF}$ and $B_{OFF}'$ for turning off the switch $SW_3$ and on mode temperature levels $B_{ON}$ and $B_{ON}'$ for turning on the same. As shown, the on and off temperature levels $B_{ON}$ and $B_{OFF}$ of the operation mode B are predetermined to rise progressively as the temperature outside the vehicle passenger compartment drops. When the outside temperature so dropping reaches a certain low level, the off mode temperature level $B_{OFF}$ is saturated to a given level $t_3$ to turn itself into the alternative off mode temperature level $B_{OFF}'$ and, likewise, the on mode temperature level $B_{ON}$ is saturated to a given level $t_5$ to turn itself into the alternative on mode temperature level $B_{ON}'$. If without such an operation mode B' or saturation range, the operation mode B would be elevated linearly with the drop of the outside temperature to make the compressor C practically inoperable. With the switch $SW_3$ on-off controlled in this way according to the complementary modes B and B', the compressor C can be powerfully operated in the summer, for example, until the associated evaporator is about to be freezed while, in the other seasons, its operation rate can be minimized to save power.

The variable temperature sensitive bypass switch $SW_4$ is employed to avoid an occurrence that, upon a drop of the outside temperature T beyond a certain predetermined level $T_0$ as in the winter, the temperature sensitive switch $SW_3$ is turned off to prevent the compressor C from being activated even when the air conditioner switch $SW_1$ is turned on, which would make impossible the removal of the fogging on the vehicle windows. When the outside temperature T drops down to the predetermined level $T_0$, the bypass switch $SW_4$ is turned on to forcibly drive the compressor C while bypassing the switch $SW_3$, to thereby enable the compressor C to perform its anti-fogging function. In detail, upon the turn-on of the bypass switch $SW_4$, the magnet clutch drive coil CL becomes controlled only by the operations of the series connected air conditioner switch $SW_1$ and defroster switch $SW_2$ to in turn control the operation of the compressor C. The bypass switch $SW_4$ is controlled by an output of an outside temperature sensor 18 (see FIG. 4) and may be on-off controlled in an operation mode C shown in FIG. 2. In the operation mode C, the bypass switch $SW_4$ is turned on when the outside temperature drops beyond a level $t_4$ and turned off when it rises beyond a level $t_6$.

In such a prior art compressor drive control, however, a critical drawback will be given rise to if, in the saturation range of the switch $SW_3$, the operation mode B' of the switch $SW_3$ and that C of the bypass switch $SW_4$ are designed to overlap each other through a temperature range $\alpha$ between the temperatures $t_4$ and $t_5$ as shown in FIG. 2. Under this condition and where the output of the evaporator temperature sensor or that of the outside temperature sensor indicates a level which lies in the range $\alpha$, both of the switches $SW_3$ and $SW_4$ will be turned off to entirely disenable the compressor C if the air conditioner switch $SW_1$ is turned on. Again, this leads to a dangerous situation wherein fogging of the vehicle windows cannot be cleared. In detail, the bypass switch SW₄ remains turned off until the outside temperature drops beyond the level t₄ while the switch SW₃ remains turned off until the evaporator temperature rises from the level t₃ to the level t₅. Such states of the switches SW₃ and SW₄ overlap in the range α, preventing the compressor C from being driven for its anti-fogging operation.

The problem discussed above may be settled by setting the operation modes B and C with sufficient margins to eliminate the overlapping range α. However, this brings about another problem that the switch SW₃ becomes turned off before the outside temperature is rather high and, thus, effective use of such a switch is unachievable as well as expected power saving. Another expedient may consist in setting up full coincidence between the temperature $t_5$ in the operation mode B' and the temperature $t_4$ in the operation mode. This is impractical, however, due to the inconsistency in the characteristics of the evaporator temperature sensors and outside temperature sensors; if not impractical, an increase in the cost is unavoidable.

The present invention contemplates to eliminate the drawback described hereinabove with a construction which, when the outside temperature reaches a predetermined low level, lowers the operation mode B progressively from the saturation range in proportion to the lowering outside temperature.

Figure 3:
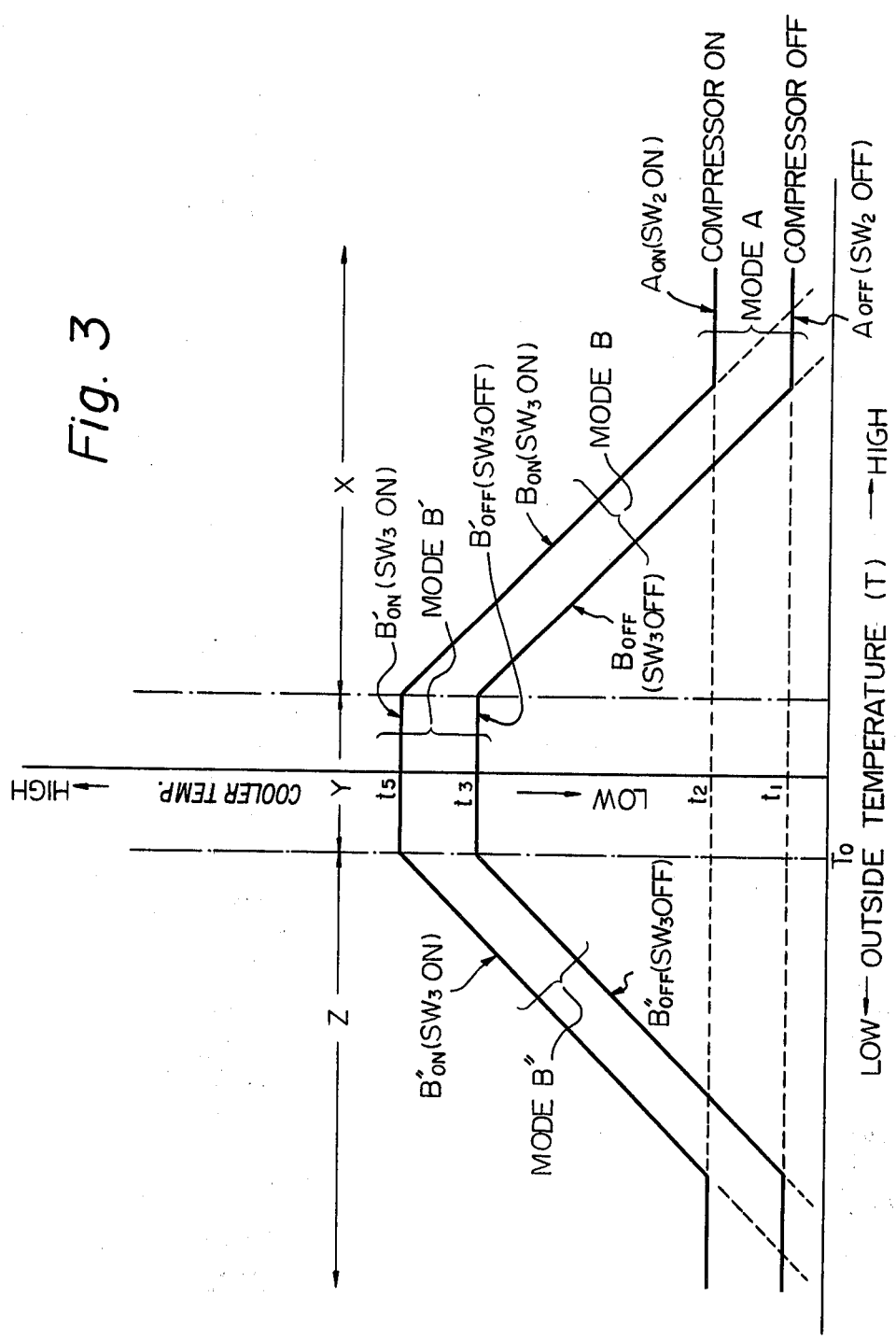
FIG. 3 is a view demonstrating an operation of an anti-fogging apparatus for an automotive air conditioning system embodying the present invention.

Referring now to FIG. 3, there is shown the operation of an anti-fogging apparatus for an automotive air conditioning system embodying the present invention. As illustrated, when the outside temperature T drops progressively, the on and off mode levels $B_{OFF}$ and $B_{ON}$ of the switch SW₃ according to this embodiment are allowed to be elevated individually to define a power saving range X. As the outside temperature T further drops, the off and on mode levels $B_{OFF}'$ and $B_{ON}'$ of the operation mode B' become saturated to the temperatures $t_3$ and $t_5$, respectively, as defined by a saturation range Y. When the temperature drop continues beyond a given predetermined low level $T_0$, the off and on mode levels $B_{OFF}''$ and $B_{ON}''$ of a third operation mode B" are caused to fall progressively in proportion to the drop of the outside temperature. This is represented by an anti-dewing region Z.

By so lowering the off and on mode levels of the compressor C, that is, the off and on mode levels $B_{OFF}''$ and $B_{ON}''$ of the switch SW₃ in proportion to the outside temperature T lower than the reference level $T_0$, the operation mode B is provided with a gradient in the anti-dewing range Z which is opposite in direction to the gradient in the power saving range X. In this specific range Z, the operation rate of the compressor C is progressively incremented so that the compressor C can be turned on when the air conditioner switch SW₁ remains turned on. This succeeds in clearing the vehicle windows of the fogging or dimming. This type of control eliminates the need for the conventional bypass switch and thereby simplifies the circuit arrangement. Moreover, the designing is facilitated because disproportionate precausion against the inconsistency in the characteristics of sensors is needless.

Figure 4:
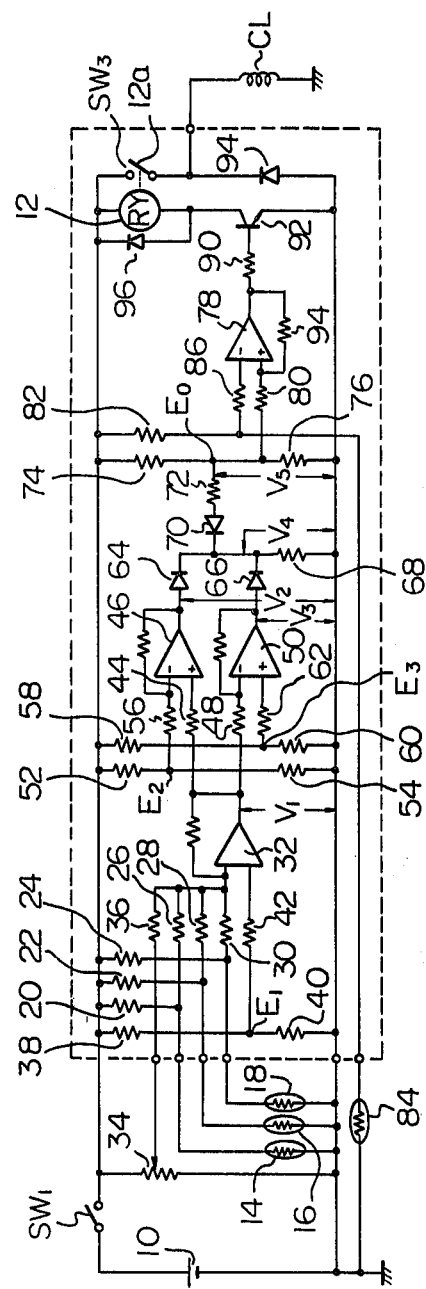
FIG. 4 is a diagram showing an electric control circuit for controlling the anti-fogging apparatus of FIG. 3.

FIG. 4 illustrates an electric control circuit associated with the anti-fogging apparatus of the present invention. As shown, the control circuit has a power supply 10 which is connected with a magnet clutch dirve coil CL via an air conditioner switch SW₁ and a variable temperature sensitive switch SW₃, which is constituted by the contact 12a of a relay 12. An inside temperature sensor 14, an insolation sensor 16 and an outside temperature sensor 18 are connected with resistors 20, 22 and 24, respectively. The output of the sensors 14, 16 and 18 produced at their junctions with the corresponding resistors 20, 22 and 24 are individually coupled to the inverting input of an operational amplifier 32. A temperature setting element 34 supplies its output also to the inverting input of the operational amplifier 32. Meanwhile, the non-inverting input of the operational amplifier 32 is supplied via a resistor 42 with a reference voltage $E_1$ which appears at the junction of resistors 38 and 40. The output $V_1$ of the operational amplifier 32 is coupled through a resistor 44 to the non-inverting input of a second operational amplifier 46 and through a resistor 48 to the inverting input of a third operational amplifier 50. The inverting input of the operational amplifier 46 is supplied with a reference voltage $E_2$ via a resistor 56 which appears at the junction of resistors 52 and 54, while the non-inverting input of the operational amplifier 50 is supplied with a reference voltage $E_3$ via a resistor 62 which appears at the junction of resistors 58 and 60. The output voltages $V_2$ and $V_3$ of the operational amplifier 46 and 50 are fed to a resistor 68 by way of diodes 64 and 66, respectively. The output voltage $V_4$ of the resistor 68 is supplied to the cathode of a diode 70 whose anode is connected via a resistor 72 to the junction of resistors 74 and 76. Produced at the junction of the resistors 74 and 76 is a voltage $E_0$ which is coupled through a resistor 80 to the non-inverting input of a fourth operational amplifier 78. The inverting input of this operational amplifier 78 is supplied via a resistor 86 with an output of a cooler temperature sensor 84 which appears at the junction of the cooler temperature sensor 84 with a resistor 82. The output of the operational amplifier 78 is fed to the base of a transistor 92 through a resistor 90, while being fed back to the non-inverting input thereof via a resistor 94. The transistor 92 has its emitter grounded and connected to the relay contact 12a via a diode 94, and its collector connected to the relay 12. A diode 96 is connected in parallel with the relay 12.

Figure 5:
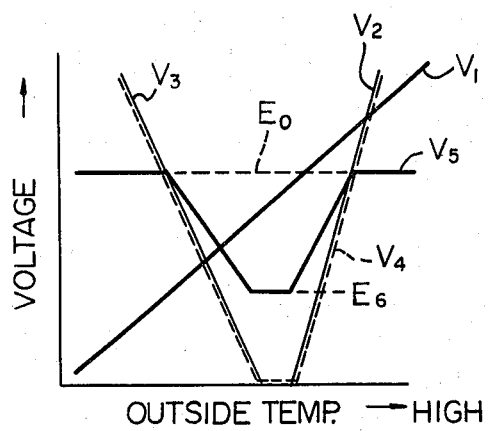
FIGS. 5 and 6 are views explanatory of an operation of the control circuit shown in FIG. 4.
Figure 6:
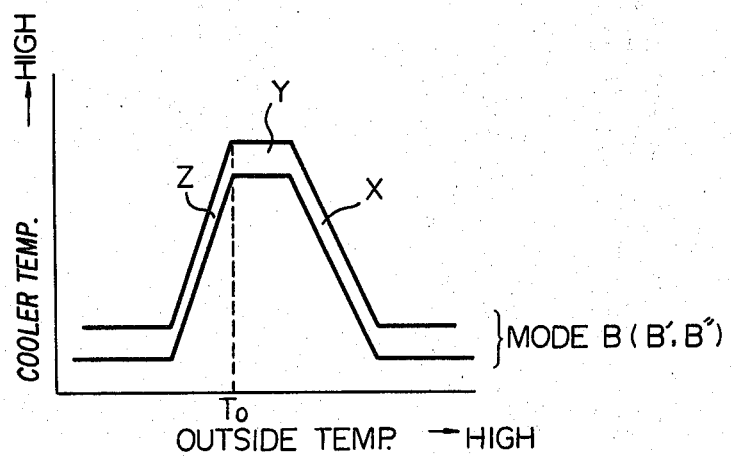

The output of the temperature setting element 34 and the outputs of the sensors 14, 16 and 18 are supplied differentially to the operational amplifier 32. As the outside temperature T progressively rises to reduce the input to the operational amplifier 32, the output voltage $V_1$ of the operational amplifier 32 is increased in proportion as indicated in FIG. 5 and coupled to the operational amplifiers 46 and 50. The operational amplifier 46 produces an output voltage $V_2$ comparing the input voltage $V_1$ with the reference voltage $E_2$. Likewise, the operational amplifier 50 produces an output voltage $V_3$ comparing the input voltage $V_1$ with the reference voltage $E_3$. The resistor 68 is therefore supplied with a composite voltage $V_4$ of the voltages $V_3$ and $V_2$. A voltage $V_5$ across the resistors 74 and 76 and obtained from the voltage $V_4$ functions to maximize the voltage $E_0$ at the junction of the resistors 74 and 76 and, when the diode 70 is rendered conductive, to minimize the voltage at the junction of the resistor 74 and the resultant parallel connection of the resistors 72 and 76. Thus, the voltage $V_5$ becomes saturated without being raised or lowered beyond the voltage $E_0$. The voltage $V_5$ thus having an inverted trapezoidal characteristic is supplied to the non-inverting input of the operational amplifier 78 as a reference voltage. Accordingly, the magnet clutch drive coil CL has a generally trapezoidal characteristic in the operation mode B as shown in FIG. 6 turned on and off by the transistor 92, which is turned on and off by the varying output of the cooler temperature sensor 84.

It will be seen from the above that the anti-fogging apparatus of the invention readily sets up the power saving range X, saturation range Y and anti-dewing range Z. With the anti-dewing range Z, the compressor C can be operated positively though the outside temperature may drop to a level near 0° C., ensuring the removal of the fogging of vehicle windows. The omission of the conventional bypass switch cuts down the cost. Since it is needless to be so precautious against the irregular characteristics among sensors, such an apparatus can be designed with ease and free from malfunctions.

Various modifications will become possible for those skilled in the art after receiving the teachings of the present disclosure without departing from the scope thereof.

What is claimed is:

1. An air conditioning system for controlling a temperature in an enclosure comprising:

a cooler for discharging cooled air into the enclosure;

a cooler temperature sensor for sensing a temperature of the cooler;

an outside temperature sensor for sensing a temperature outside the enclosure; and operation control means for turning the cooler on and off, said operation control means being constructed to compute a control on temperature and a control off temperature as predetermined functions of the cooler temperature and the outside temperature, turn the cooler on when the cooler temperature is higher than the control on temperature, and turn the cooler off when the cooler temperature is lower than the control off temperature;

said operation control means being further constructed to change said control on and off temperatures to different levels such that the control on and off temperatures increase as the outside temperature decreases and when the outside temperature is above a first predetermined temperature, the control on and off temperatures are maintained constant at upper limits when the outside temperature is varied between the first predetermined temperature and a second predetermined temperature which is lower than the first predetermined temperature, and the control on and off temperatures decrease as the outside temperature further decreases and when the outside temperature is below the second predetermined temperature.

2. A system as claimed in claim 1, in which the cooler comprises an evaporator, said cooler temperature being at least one of a temperature adjacent to the evaporator and a temperature of the evaporator surface.

3. A system as claimed in claim 1, in which the cooler comprises a compressor, said operation control means being further constructed to control the compressor to be turned on and off.

4. A system as claimed in claim 1, in which the control on temperature is higher than the control off temperature.

5. A system as claimed in claim 1, in which the enclosure is a passenger compartment of an automotive vehicle.

* * * * *